UNITED STATES PATENT OFFICE.

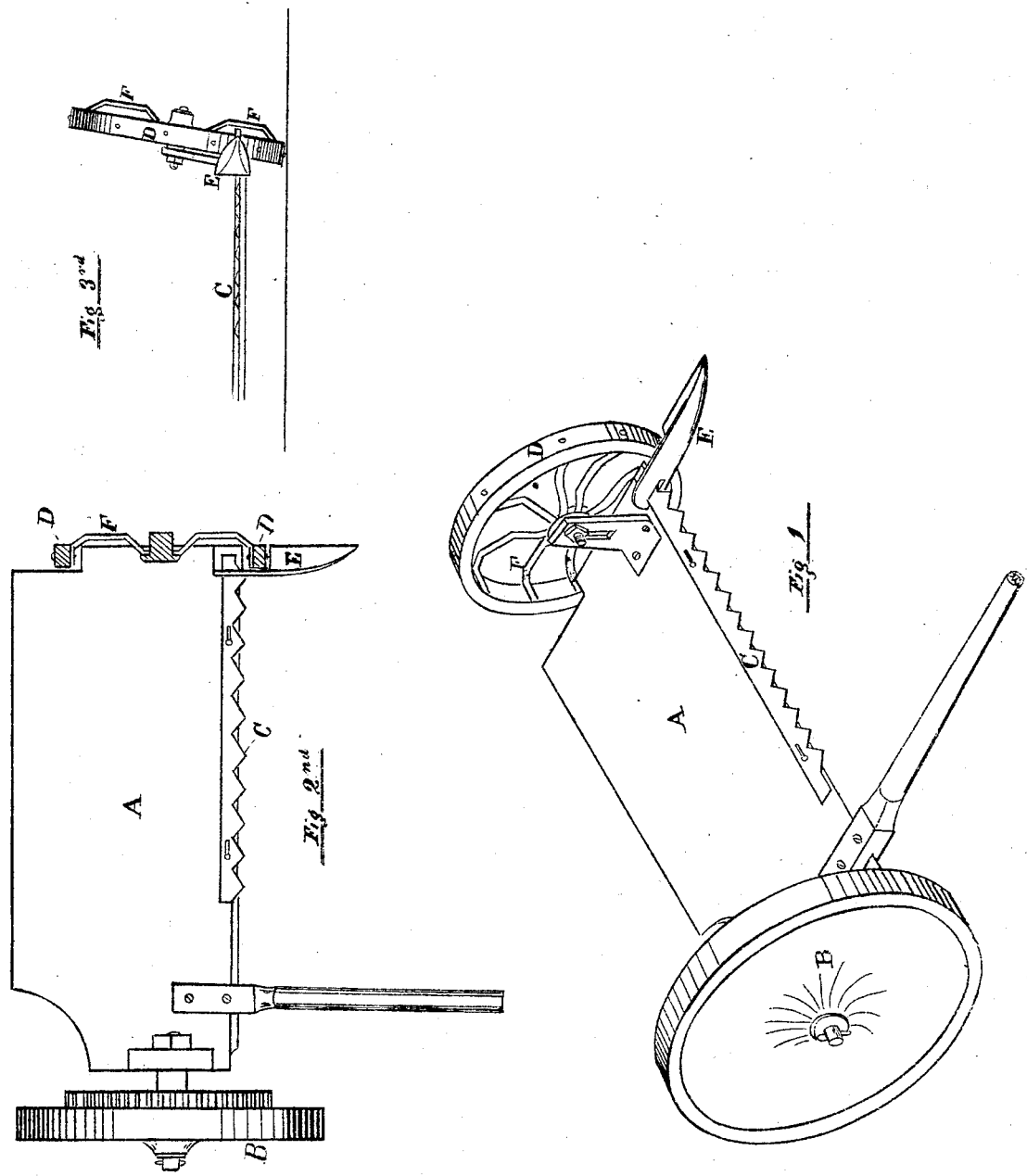
J. Whitehead,
Mower.
No. 19055
Patented Jan. 5, 1858.

JESSE WHITEHEAD, OF MANCHESTER, VIRGINIA.

IMPROVEMENT IN HARVESTERS.

Specification forming part of Letters Patent No. 19,055, dated January 5, 1858.

*To all whom it may concern:*

Be it known that I, JESSE WHITEHEAD, of Manchester, in the county of Chesterfield and State of Virginia, have invented a new and useful Improvement in Harvesters; and I do hereby declare that the following is a full and exact description thereof, reference being had to the accompanying drawings, making a part of this specification, in which—

Figure 1 is a perspective view of the improvement as applied to a harvester or reaping-machine. Fig. 2 is a plan of the same, with the bearing-wheel shown in section; and Fig. 3 is a front elevation of a part of the machine, showing the inclination of the bearing-wheel.

The same letters of reference denote like parts in all the figures.

A is the platform of the machine. B is the main driving-wheel. C are the cutting-knives. D is the bearing-wheel, and E is the shoe or separator.

The nature of my improvement consists in making the bearing-wheel D, which is at the end of the machine nearest the standing grain, of such a formation as will admit of a part of the rim of such wheel being in front of the cutting-knives. This I accomplish by making the wheel aforesaid with the spokes concave, the convex side of such wheel being outward toward the grain. The opposite or concave side, being inward toward the platform of the machine, allows the cutting-bar to play laterally without coming in contact with the spokes of said wheel.

In order that the bearing-wheel shall not crush down the standing grain, the shoe or separator is made with a recess in it to receive the rim of such wheel, the outward and forward edge of the separator being brought out so that it will gather the grain in the cutters, so that the bearing-wheel shall pass without interfering with the grain which has not been cut; and the more effectually to accomplish this end I lean the top of such wheel over toward the grain, (its large diameter allows of this being done without throwing the wheel so much out of the perpendicular as to interfere with its easy action,) which brings the tread of such wheel inside of the line which the separating point or shoe makes in the grain. This is clearly shown in Fig. 3.

By making the bearing-wheel and shoe as thus described I am enabled to bring the tread of the bearing-wheel nearly under the cutting-knives, and consequently the knives will always be at a uniform height from the ground. It also enables me to use a wheel of such a diameter that the machine will pass over a water furrow or rut with ease, as that part of the rim of the wheel that is in front of the knives will roll up the opposite side of the furrow before the points enter the soil, and the center of the bearing-wheel and the main driving-wheel being nearly in a line, the machine can be wheeled round without dragging or scraping up the ground. The draft will also be greatly diminished and the machine will be more nearly balanced than is practicable where the bearing-wheel is placed behind the cutters.

I do not wish it to be understood that I confine myself to a spoke-wheel, as it is obvious that a plate-wheel would be the same if it were concaved out to receive the play of the cutting-bar.

I am aware that concave wheels have been used heretofore on harvesters. Therefore I make no claim to a concave wheel as such; but

What I claim as new, and desire to secure by Letters Patent, is—

The concave supporting-wheel D, constructed and located as shown and described, in combination with the recess in the shoe for receiving the rim of said supporting-wheel, the whole being constructed in the manner and for the purposes set forth.

JESSE WHITEHEAD.

Witnesses:
 DONALD BRADLEY,
 JOS. P. WINSTEN.